Figure 1:
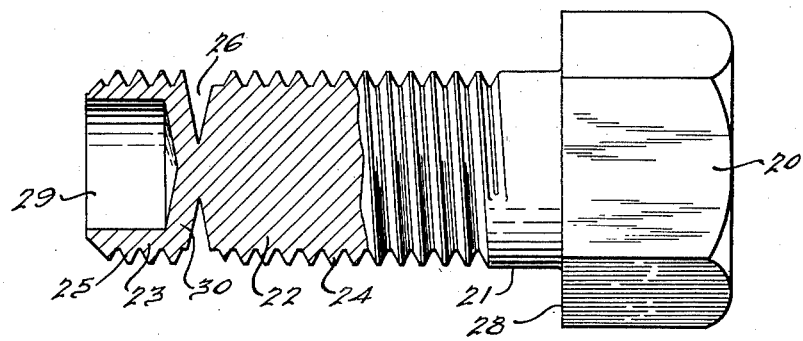

June 5, 1951        H. B. RUDD        2,555,661

SELF-LOCKING BOLT

Original Filed July 3, 1948

INVENTOR.
Harry B. Rudd.
BY
Harness, Dickey & Pierce
ATTORNEYS.

Patented June 5, 1951

2,555,661

UNITED STATES PATENT OFFICE 2,555,661

SELF-LOCKING BOLT

Harry B. Rudd, Flushing, N. Y., assignor to Eaton Manufacturing Company, Cleveland, Ohio, a corporation of Ohio Original application July 3, 1948, Serial No. 36,895. Divided and this application March 19, 1951, Serial No. 216,313

1 Claim. (Cl. 151—32)

This invention relates to a new type of bolt or screw and more particularly relates to a new type of self-locking bolt or screw.

This is a divisional application of my copending application Serial No. 36,895, filed in the Patent Office July 3, 1948.

Objects and advantages of the invention will be set forth in part hereinafter and in part will be obvious herefrom or may be learned by practice with the invention, the same being realized and attained by means of the instrumentalities, processes, steps and combinations pointed out in the appended claim.

The invention consists in the novel steps, parts, constructions, arrangements, processes, combinations and improvements herein shown and described.

The accompanying drawing referred to herein and constituting a part hereof illustrates embodiments of the invention and together with the description serve to explain the principles of the invention.

Figure 2:
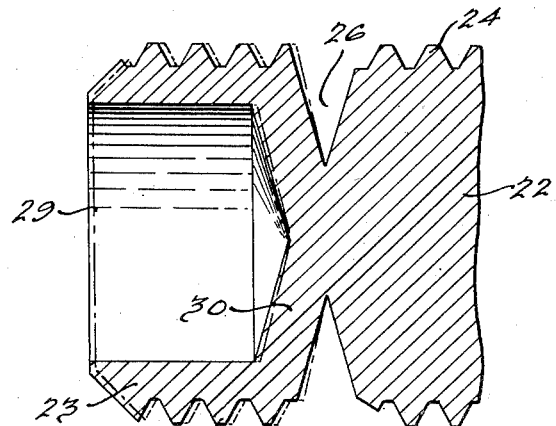
Figure 3:
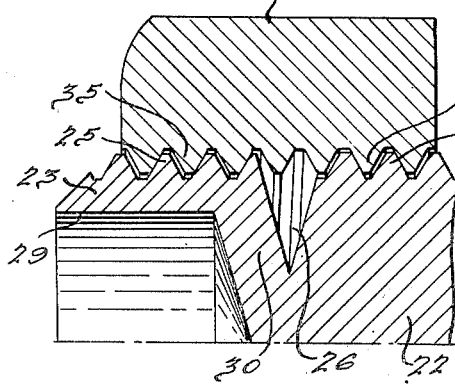

Of the drawing:

Fig. 1 is a side view, partly in section, of one embodiment of the invention, showing the subject bolt at one point in its fabrication;

Fig. 2 is an enlarged fragmentary cross-sectional view of a shank portion of the self-locking bolt shown in Fig. 1 and in particular illustrates the relationship of different parts of the shank after the bolt has been completed so as to become self-locking; and Fig. 3 is an enlarged fragmentary, cross-sectional view of a part of the bolt as shown in Fig. 2 and illustrates the position of the various threads on the shank with respect to the internally threaded member into which the shank is inserted.

An object of the subject invention is to provide a bolt which will be held tightly in its co-operating threaded member without the aid of lock nuts or other similar devices.

Another object of this invention is to provide a self-locking bolt which can be manufactured less expensively than the self-locking bolts now in use.

A further object of this invention is to provide a self-locking bolt which can be more easily inserted into a socket than the bolts now in use and which will at the same time apply strong gripping forces to the co-operating threads of the member within which it seats.

Still another object of the invention is to provide methods by which the subject self-locking bolt can be manufactured.

The present invention provides a bolt or screw formed with a shank having a pair of interconnected threaded sections. The threads of said two sections are of the same pitch but are of mismatched leads with respect to each other; that is, the threads of the two sections are interrupted and are not a true continuation or alignment of each other, the threads of one section being, in effect, rotated through a relatively small angle with respect to an aligned relationship with the threads of the other section in order to obtain said mismatched lead relationship. The bolt with threads so formed will engage a female member which is uniformly threaded in a binding relationship, bringing about the desirable locking characteristics of the bolt. A yielding relationship must be established between the threaded sections of such a bolt, and in the bolt of the present invention this is effected by providing one threaded section of the bolt with a central bore closed at one end by a relatively thin wall or diaphragm by which the section is secured to the other threaded section. This diaphragm allows relative axial movement between the two threaded sections as the bolt engages the co-operating member into which it is fitted, whereby a yielding, binding relationship between the threads is established, allowing the bolt to be turned but with a force which may be predetermined so that the bolt will remain in place in normal and expected usage.

The bolt of the invention may be made with an integral shank having the two interrupted threaded portions as parts thereof, or one threaded portion may be separately formed as a cup member and welded, riveted, or otherwise suitably secured to the other threaded portion at the cup bottom or diaphragm.

In fabricating the bolt of the invention the shank portion may be conveniently threaded by rolling, cutting, or other suitable methods with the individual threaded sections in alignment as true continuation of each other, and the sections may then be axially displaced with respect to each other, in either direction, depending upon the use for which the bolt is desired in order to bring about the mismatched lead relationship. Alternatively, the bolt can be fabricated by threading the two sections in the mismatched lead relationship.

It will be understood that the foregoing general description and the following detailed description as well are exemplary and explanatory of the invention but are not restrictive thereof.

Referring now in detail to the illustrative embodiments of the invention shown by way of example in the accompanying drawing, one embodiment of the invention is illustrated in Figs. 1 to 3 inclusive. A self-locking bolt is shown having a head 20 and a shank 21. The shank 21 comprises two sections, the head section 22 being positioned adjacent to, and the end section 23 being positioned further away from, the head 20. The sections 22 and 23 are of the same diameter and are provided with threads of the same pitch.

A central bore 29 is provided in the end section 23 so as to give the section cylindrical formation. The bore 29 is of substantial depth and terminates at a thin wall or diaphragm 30 by which the shank sections 22 and 23 are integrally connected. The diaphragm 30 is relatively flexible so as to permit axial displacement of the threaded shank sections 22 and 23.

In the fabrication of the bolt of the embodiment of Figs. 1 to 3 inclusive of the drawing, the bolt blank with head 20 and shank 21 is first provided, and is thereafter bored at 29 and grooved at 26 by any suitable machining operation, and also the threads for sections 22 and 23 are made in any suitable way as, for instance, by a rolling operation. The threads are initially in a matched lead relationship; that is, one is a continuation of the other although in axially spaced relationship by means of the groove at 26, the bolt at this stage of its fabrication being shown in Fig. 1. The threaded sections 22 and 23 are thereafter positioned in a mismatched lead relationship by the application of axially directed force sufficient to permanently flex the thin wall or diaphragm 30. The direction of applications of axial force to effect this result will depend upon the use to which the bolt will be put. Thus, where a bolt of the form shown in Fig. 1 is to be provided the head 20 of which is to be tightened down with its shoulder 28 against an opposing surface, the forces on the bolt in use are directed axially against the head 20 toward the right as viewed in Fig. 1; that is, the forces exerted tend to elongate the shank and head.

In order to provide most effectively for the locking of a bolt of this type, the end section 23 is pulled away from the threaded section 22 by the proper application of axially directed force, thus permanently flexing the diaphragm 30, the sections and diaphragm assuming the finished form shown in full lines in Fig. 2 of the drawings from the dotted-line position. In Fig. 3 the finished bolt of such type is illustrated engaged in the internally threaded member 34, the threads 35 whereof are continuous and in alignment. The threads 24 of section 22 of the bolt shank are tightly engaged against threads 35 of the member 34 on the faces nearer the head 20 because of the forces exerted in use as described, and the threads 25 of the section 23 are tightly engaged against threads 35 on the opposite faces; that is, those away from the head 20 of the bolt, due to the described displacement of the end section 23 in fabrication. It will be understood that the flexible diaphragm 30 allows limited axial displacement of the sections 22 and 23 as the bolt is seated against threads 35 of element 34, the parts returning to their original position when the bolt is removed.

It will be apparent that the threads 24 and 25 may be applied to the shank 21 of the bolt either before or after said shank has been grooved and bored at 26 and 29 respectively. Furthermore, although the threads are preferably applied first in matched lead relationship as described and the sections 22 and 23 thereafter displaced, it will be apparent that the bolt could also be formed by application of the threads originally in their relationship of mismatched leads, and the subsequent axial displacement of the threaded sections could be dispensed with. This latter method of fabrication is in general more troublesome and expensive to effect, and for that reason the earlier described fabrication method is preferred.

The invention in its broader aspects is not limited to the specific mechanisms and methods shown and described but departures may be made therefrom within the scope of the accompanying claim without departing from the principles of the invention and without sacrificing its chief advantages.

Having thus described the invention, I claim:

An integral self-locking screw having a shank, said shank provided intermediate its ends with an annular circumferentially continuous groove having radially inwardly convergent walls and defining axially spaced inner and outer shank portions, said outer shank portion provided with a central bore having a conical inner end wall, said groove extending radially inwardly beyond the outer cylindrical wall of the bore, both the end wall of the bore and the adjacent wall of said groove converging in the direction of said inner shank portion and said walls collectively defining a longitudinally flexible and resilient annular diaphragm which slopes at a substantial angle radially inwardly and axially toward said inner shank portion, said diaphragm permitting relative axial movement between said inner and outer shank portions, an external rolled screw thread formed on said inner shank portion, an external rolled screw thread formed on said outer shank portion in mismatched relation with respect to the thread on said inner shank portion and offset in the direction of said inner shank portion a distance equal to a minor portion of the lead of a thread.

HARRY B. RUDD.

No references cited.